US006849206B2

(12) United States Patent
Matsuo

(10) Patent No.: US 6,849,206 B2
(45) Date of Patent: Feb. 1, 2005

(54) PASTE FOR FORMING THICK FILM, METHOD FOR MANUFACTURING THEREOF, AND FILTER APPARATUS

(75) Inventor: Masahiro Matsuo, Moriyama (JP)

(73) Assignee: Murata Manufacturing Co. Ltd (JP)

( * ) Notice: Subject to any disclaimer, the term of this patent is extended or adjusted under 35 U.S.C. 154(b) by 476 days.

(21) Appl. No.: 09/879,584

(22) Filed: Jun. 12, 2001

(65) Prior Publication Data

US 2002/0011592 A1 Jan. 31, 2002

(30) Foreign Application Priority Data

Jun. 12, 2000 (JP) ......................................... 2000-175758

(51) Int. Cl.[7] .......................... H01B 1/22; B01D 39/20; B32B 5/26
(52) U.S. Cl. ...................... 252/514; 252/510; 252/511; 210/499; 210/500; 210/505; 210/336; 210/356
(58) Field of Search ............................. 252/510, 511, 252/514, 500, 502, 503; 106/1.18; 210/499, 500.1, 505, 507, 162, 284, 336, 356

(56) References Cited

U.S. PATENT DOCUMENTS 4,515,691 A * 5/1985 Ida et al. .................... 210/274
5,653,918 A * 8/1997 Towlson ...................... 252/514
5,665,479 A * 9/1997 Vandamme et al. ......... 428/613
5,779,899 A * 7/1998 Shiomi et al. ............... 210/346
5,916,628 A * 6/1999 Ueyama et al. ............. 427/115

FOREIGN PATENT DOCUMENTS

| JP | 08-293652 | | 11/1996 | |
| JP | 10-199331 | * | 7/1998 | ............ H01B/1/16 |
| JP | 10-335167 | | 12/1998 | |
| JP | 11-016766 | | 1/1999 | |
| JP | 11-102615 | | 4/1999 | |
| JP | 2000-129311 | * | 5/2000 | ............ B22F/3/11 |
| JP | 2000-133065 | | 5/2000 | |

* cited by examiner

*Primary Examiner*—Mark Kopec
*Assistant Examiner*—Kallambella Vijayakumar
(74) *Attorney, Agent, or Firm*—Dickstein, Shapiro, Morin & Oshinsky, LLP.

(57) ABSTRACT

A method for manufacturing a paste for forming a thick film is provided, in which undesired lump materials are efficiently removed from the paste for forming the thick film. The paste, which contains a solid material and an organic vehicle and has a viscosity in the range of about 1 to 50 Pa·s, is filtrated with a sintered metal type filter manufactured by integrally sintering a nonwoven fabric filter part, having a thickness of many folded linear metal fibers and having a mesh opening size of about 1 to 20 μm, and a wire gauze part composed of metal wires knitted into the shape of a mesh.

24 Claims, 6 Drawing Sheets

PASTE FOR FORMING THICK FILM, METHOD FOR MANUFACTURING THEREOF, AND FILTER APPARATUS

BACKGROUND OF THE INVENTION

1. Field of the Invention

The present invention relates to a method for manufacturing a paste for forming a thick film, the paste for forming the thick film and a filter apparatus. In particular, the present invention relates to a method for manufacturing a conductive paste for an internal electrode of a monolithic ceramic capacitor, etc., the conductive paste produced by the aforementioned method for manufacture and a filter apparatus.

2. Description of the Related Art

Pastes for forming a thick film have various solid materials depending on the purpose dispersed in organic vehicles. A paste for forming the thick film means a paste used in the formation of the thick film by a screen printing, a spray method, etc. More specifically, various pastes, for example, conductive pastes for forming internal electrodes of laminated ceramic electronic components, resistor pastes for forming thick film resistances of thick film circuit substrates, dielectric material pastes for forming monolithic ceramic capacitors and insulator pastes for insulation between layers of multilayer wiring substrates, are examples.

For example, as the conductive paste for forming internal electrodes of monolithic ceramic capacitors, etc., the pastes have noble metal powders, e.g., Au, Pd, Ag and Ag/Pd alloys, and base metal powders, e.g., Ni and Cu, as solid materials, dispersed in organic vehicles with a triple roller mill, etc., and may be filtrated using filter parts such as stainless steel wire gauzes (sieves) and filter cloths having mesh opening sizes of about 40 $\mu$m. The stainless steel wire gauze used for filtering the dispersion paste is composed of, for example, stainless steel wires knitted into the shape of a mesh, and foreign materials larger than the mesh opening size can be removed by passing the paste through the mesh part of the stainless steel wire gauze.

According to the conventional methods for manufacturing the paste for forming the thick film, however, protrusions of several $\mu$m to about 40 $\mu$m are likely to be generated on the print surface printed with the paste. It is believed that the protrusions are generated by solid materials of several $\mu$m to about 1 $\mu$m, metal foils generated in the triple roller mills, dusts which get into the paste during other steps, impurities such as skins, and insoluble materials in resin components, such as ethyl cellulose and acryl, contained in the organic vehicle (hereafter these are generically called lump materials), in the paste for forming the thick film. It is difficult to sufficiently remove those lump materials with the aforementioned stainless steel wire gauzes and filter cloths.

During filtration with the conventional stainless steel wire gauzes and filter cloths, lump materials having a size in the neighborhood of 1.4 times to 2 times the nominal mesh opening size pass through in practice. In particular, since the mesh openings are planar, needle-like lump materials, etc., are likely to pass through the conventional filtration units. When a pressure was applied to the materials to be filtrated, some lump materials are deformed due to this pressure so as to pass through the filter part.

When the paste for forming thick film is a conductive paste, and the internal electrodes of the laminated ceramic electronic component were formed using this, the conductive paste may not pass through the print screen mesh during the printing on the ceramic green sheet when undesired sizes of lump materials are present in the conductive paste, and therefore, there were problems in that deficiency was generated in the printed pattern, etc.

Furthermore, in the case in which the thickness of the ceramic green sheet was smaller than the size of the aforementioned lump materials, the aforementioned lump materials penetrated the ceramic green sheet, so that there were problems in that the reliability and the yield of the resulting electronic component were reduced by a large degree.

In order to improve the printing precision of the paste for forming thick film used in the screen printing, the viscosity was made relatively high, e.g., 1 to 50 Pa·s, and a thixotropic property was provided. But since the solid materials had small degree of freedom of movement in the dispersion paste, and the conventional high filtration precision filter had a large pressure loss, there was a problem in that the solid materials caked on the surface of the filter and the dispersion paste was not likely to be effectively filtrated. In this case, the effective filtration means filtration in which only coarse particles in the pigment and lump materials are removed from the paste without variation in basic properties, for example, composition, viscosity, specific gravity, flowability, etc., of the paste for forming thick film, so as to improve cleanliness.

SUMMARY OF THE INVENTION

The present invention was made in consideration of the aforementioned situation. Accordingly, it is an object of the present invention to provide a method for manufacturing a paste for forming a thick film in which lump materials are efficiently removed from a dispersion paste, the paste for forming the thick film thereby produced, and a filter apparatus suitable for manufacturing the paste for forming the thick film.

According to an aspect of the present invention, a method for manufacturing a paste for forming a thick film is composed of the step of filtering a dispersion paste with a filter including a nonwoven fabric filter part having a mesh opening size of about 1 to 20 $\mu$m, wherein the dispersion paste contains a solid material and an organic vehicle and has a viscosity in the range of about 1 to 50 Pa·s.

The method for manufacturing the paste for forming the thick film according to the present invention is preferably further composed of the steps of passing the aforementioned paste through the aforementioned nonwoven fabric filter part, and subsequently, passing the paste through a wire gauze part so as to remove undesired lump material from the dispersion paste, wherein the aforementioned filter is composed of a sintered metal type filter manufactured by integrally sintering the aforementioned nonwoven fabric filter part having a specified thickness of a lot of folded linear metal fibers, and the aforementioned wire gauze part composed of metal wires knitted into the shape of a mesh.

The aforementioned metal fiber of the aforementioned nonwoven fabric filter part is preferably composed of stainless steel fiber and the aforementioned wire gauze part is preferably composed of stainless steel wire gauze. The aforementioned nonwoven fabric filter part preferably has a multilayer structure, in which the neighborhood of the surface of the nonwoven fabric filter part is coarsest and the neighborhood of the interface between the nonwoven fabric filter part and the wire gauze part is densest.

The method for manufacturing the paste for forming the thick film according to the present invention may be further composed of the steps of passing the paste through the aforementioned nonwoven fabric filter part, and subsequently, passing the paste through a wire gauze part so as to remove undesired lump material from the paste, wherein the aforementioned filter may be composed of a sintered metal type filter manufactured by integrally sintering the nonwoven fabric filter part, composed of a porous aggregate of metal particles, and a wire gauze part composed of metal wires knitted into the shape of a mesh.

The aforementioned wire gauze part is preferably composed of stainless steel wire gauze. The aforementioned nonwoven fabric filter part preferably has a multilayer structure in which the neighborhood of the surface of the nonwoven fabric filter part is coarsest and the neighborhood of the interface between the nonwoven fabric filter part and the wire gauze part is densest.

The method for manufacturing the paste for forming the thick film according to the present invention is preferably further composed of the step of filtering the disperse paste with multiple stages of sintered metal type filters, in which a plurality of the sintered metal type filters are arranged in vertically multiple stages. The method for manufacturing the paste for forming the thick film may be further composed of the step of filtering the disperse paste with the sintered metal type filter and a wire gauze type filter, wherein the wire gauze type filter, composed of metal wires knitted into the shape of a mesh, is provided in at least one of the upper stage and lower stage of the sintered metal type filter.

According to another aspect of the present invention, a paste for forming a thick film is provided, wherein the paste is manufactured by the aforementioned method according to the present invention, contains a solid material and an organic vehicle, and has a viscosity in the range of about 1 to 50 Pa·s.

According to another aspect of the present invention, a filter apparatus including a filter part for filtering a dispersion paste is provided, wherein the dispersion paste contains a solid material and an organic vehicle, and has a viscosity in the range of about 1 to 50 Pa·s, and the filter part is composed of a filter including a sintered nonwoven fabric filter part having a mesh opening size of about 1 to 20 μm.

Regarding the filter apparatus according to the present invention, the aforementioned filter is preferably composed of a sintered metal type filter manufactured by integrally sintering a nonwoven fabric filter part having a specified thickness comprised of a multitude of folded linear metal fibers, and a wire gauze part including metal wires knitted into the shape of a mesh.

The aforementioned metal fiber of the nonwoven fabric filter part is preferably composed of stainless steel fiber and the aforementioned wire gauze part is preferably composed of stainless steel wire gauze. The nonwoven fabric filter part preferably has a multilayer structure in which the neighborhood of the surface of the nonwoven fabric filter part is coarsest and the neighborhood of the interface between the nonwoven fabric filter part and the wire gauze part is densest.

Regarding the filter apparatus according to the present invention, the aforementioned filter may be composed of a sintered metal type filter manufactured by integrally sintering the nonwoven fabric filter part, composed of a porous aggregate of metal particles, and a wire gauze part including metal wires knitted into the shape of a mesh.

The aforementioned wire gauze part is preferably composed of stainless steel wire gauze, and the aforementioned nonwoven fabric filter part preferably has a multilayer structure, in which the neighborhood of the surface of the nonwoven fabric filter part is coarsest and the neighborhood of the interface between the nonwoven fabric filter part and the wire gauze part is densest.

Regarding the filter apparatus according to the present invention, a plurality of sintered metal type filters may be arranged in vertically multiple stages, and a wire gauze type filter, including metal wires knitted into the shape of a mesh, may be provided in at least one of the upper stage and lower stage of the sintered metal type filter.

DESCRIPTION OF THE PREFERRED EMBODIMENTS

Figure 1:
FIG. 1 is a representation of a sectional photograph of a sintered metal type filter (stainless steel fiber type) according to an embodiment of the present invention.

A method for manufacturing a paste for forming a thick film according to the present invention especially resides in a method for filtering the paste. In particular, the present invention resides in the filtration of the paste using a filter including a nonwoven fabric filter having a mesh opening size of about 1 to 20 μm.

As the nonwoven fabric filter, for example, sintered metal type filters and ceramic filters can be used. Specifically, porous sintered nonwoven fabric filters, in which stainless steel fibers and metal particles are sintered, are preferable. As the filter including the aforementioned sintered nonwoven fabric filter, a sintered metal type filter in which stainless steel fibers are accumulated on a stainless steel wire gauze and then are pressed and integrally sintered, or a sintered metal type filter in which metal particles are accumulated on a stainless steel wire gauze and then pressed and integrally sintered, can be used.

Regarding the present invention, since the mesh opening size of the nonwoven fabric filter is about 20 μm or less, the effect of removing lump materials is superior compared to that of the filtration with conventional stainless steel wire gauzes and filter cloths, and furthermore, since the mesh opening size is about 1 μm or more, solid materials required for the pastes are not removed, so that the properties of filtrated paste for forming the thick film are not adversely affected.

In the case in which the paste for forming the thick film is a conductive paste and an internal electrode of a laminated ceramic electronic component is formed therefrom, the mesh opening size of the final stage filter is preferably equivalent to or less than the thickness of the ceramic green sheet to be printed in order to also ensure the quality of the resulting electronic component. Specifically, for example, when the thickness of the ceramic green sheet is 7 $\mu$m, it is preferable to select a 5 $\mu$m filter having the mesh opening size of 7 $\mu$m or less as the final stage filter.

When a filter in which only stainless steel fibers or metal particles are sintered without being provided with a stainless steel wire gauze in the lower stage, is used, since it is feared that the stainless steel fibers or metal particles fall off during the filtration of the dispersion paste so as to get into the filtrated paste for forming the thick film, a sintered metal type filter in which a nonwoven fabric filter part composed of the stainless steel fibers or the metal particles and a wire gauze part composed of stainless steel wire gauze, etc., are integrally sintered, is preferably used in the method for manufacturing the paste for forming the thick film according to the present invention.

The nonwoven fabric filter part composed of the stainless steel fibers or the metal particles preferably has a multilayer structure composed of layers having different densities, in which the stainless steel fibers or the metal particles are arranged so that the neighborhood of the upper surface of the nonwoven fabric filter part is coarsest and the neighborhood of the interface between the nonwoven fabric filter part and the wire gauze part is dense.

By making the nonwoven fabric filter have the multilayer structure in order that the paste passes through an initial stage layer of high porosity and latter stage layers in which porosities decrease as it nears the final stage, large lump materials are removed at the neighborhood of the upper surface of the nonwoven fabric filter, and finer lump materials are removed at the neighborhood of the center part of the nonwoven fabric filter, so that the clogging of the nonwoven fabric filter can be reduced.

Regarding the filtration of the dispersion paste, when a fine filter having a mesh opening size of about 20 $\mu$m or less as in the present invention is used and the coagulation force of solid materials is strong or many impurities are present, the lifetime of the filter may be decreased to a great degree due to the clogging of the filter. In such a case, a multistage filtration is preferably performed with multiple stages of filters.

That is, the lifetime of the lower stage filter can be increased by being provided with at least one filter having a precision lower than finally required filter precision, that is, a filter having a large mesh opening size, at a previous stage. More specifically, for example, a filter including a nonwoven fabric filter part having a mesh opening size of about 10 $\mu$m is provided at the first stage and a filter including a nonwoven fabric filter part having a mesh opening size of about 7 $\mu$m is provided at the second stage. In addition, a filter including a nonwoven fabric filter part having a mesh opening size of about 5 $\mu$m may be provided at the third stage.

The filter according to the present invention may be provided at the second stage and the conventional stainless steel wire gauze having a coarse mesh opening may be provided at the first stage. In addition, the conventional stainless steel wire gauze may be provided at the third stage and a filter having a finer mesh opening according to the present invention may be provided at the fourth stage.

In the case in which the filtration is performed with such a nonwoven fabric filter having a fine mesh opening as that according to the present invention, solid materials in the dispersion paste may be removed more than necessary. Since the thickness of the coating film in the formation of the thick film by printing, etc., is controlled based on the content of the solid materials in the paste for forming the thick film, when the content of the solid materials is decreased to less than the designed value due to the filtration, a problem may occur in that the required thickness of the coating film cannot be produced.

Therefore, in the method for manufacturing the paste for forming the thick film according to the present invention, the content of the solid materials in the disperse paste before the filtration is controlled beforehand to a higher level than the designed value in anticipation of losses of solid material powders due to the filtration. Therefore, the content of the solid materials in the paste for forming the thick film after the filtration can be controlled at a desired value. In particular, in the case in which the loss of solid materials due to the filtration varies depending on the paste lot used, solid materials are added in an amount larger than the loss of solid materials due to the usual filtration by 3% to 4%, and after the filtration, a primary solvent may be added to the dispersion paste until the content of the solid materials reaches a required value so as to produce the paste having the desired content of the solid materials.

The aforementioned solid materials include inorganic solid materials (inorganic powders) and organic solid materials (organic powders), for example, metal powders, glass powders, metal oxide powders and resin powders.

Next, an embodiment of a sintered metal type filter including a nonwoven fabric filter part will be explained with reference to FIG. 1, FIG. 2 and FIG. 3.

Figure 2A:
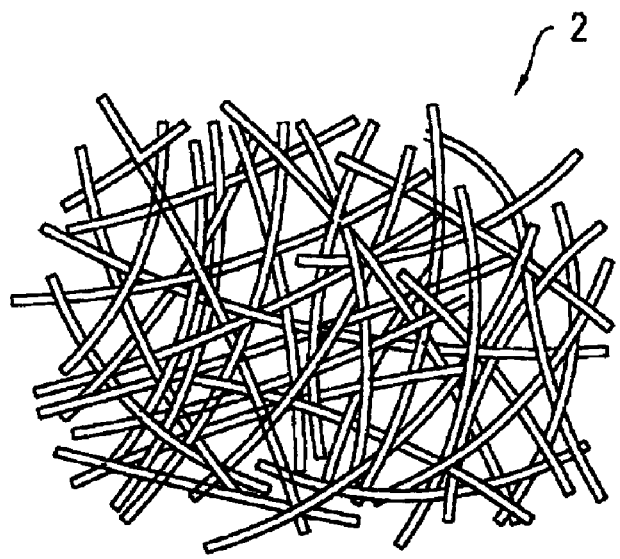
FIG. 2A is a schematic diagram of the upper surface of a stainless steel fiber part in the aforementioned sintered metal type filter.
Figure 2B:
FIG. 2B is a representation of an enlarged photograph of the aforementioned upper surface of the stainless steel fiber part.
Figure 3A:
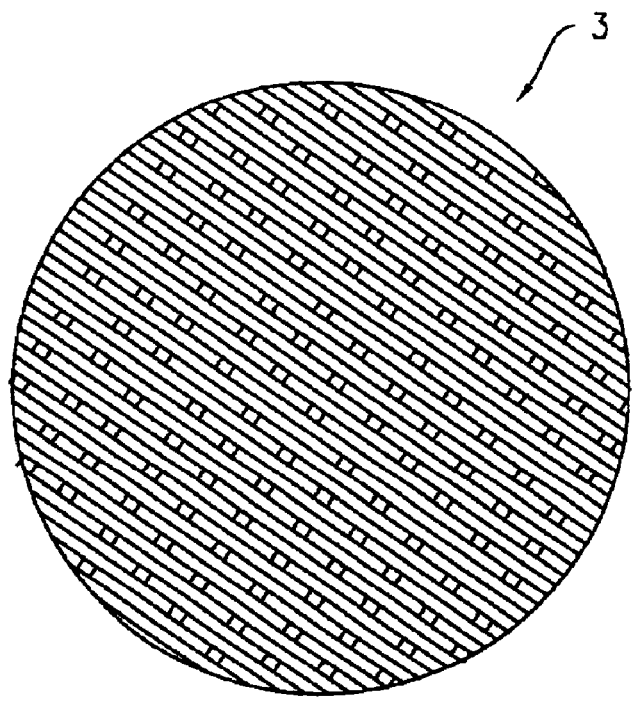
FIG. 3A is a schematic diagram of the upper surface of a stainless steel wire gauze part.
Figure 3B:
FIG. 3B is a representation of an enlarged photograph of the upper surface of the stainless steel wire gauze part.

As shown in FIG. 1, a sintered metal type filter 11 is composed of a nonwoven fabric filter part 2 and a wire gauze part 3. The nonwoven fabric filter part 2 is further composed of a coarse part 2a and dense part 2b. The nonwoven fabric filter part 2, that is, each of the coarse part 2a and the dense part 2b, is composed of linear stainless steel fibers as shown in FIG. 2A and FIG. 2B, and a lot of stainless steel fibers are folded so as to form a three-dimensional structure having a specified thickness in the direction of the height. The wire gauze part 3 is composed of a twill basket woven stainless steel wire gauze as shown in FIG. 3A and FIG. 3B.

Another embodiment of a sintered metal type filter including a nonwoven fabric filter part will be explained with reference to FIG. 4 and FIG. 5.

Figure 4:
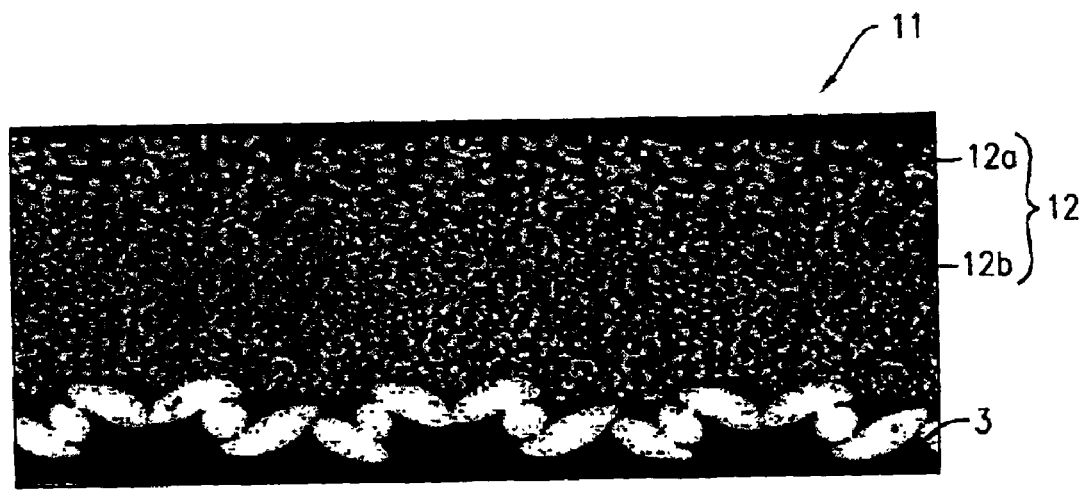
FIG. 4 is a representation of a sectional photograph of another sintered metal type filter (metal particle porous aggregate type) according to the aforementioned embodiment of the present invention.
Figure 5:
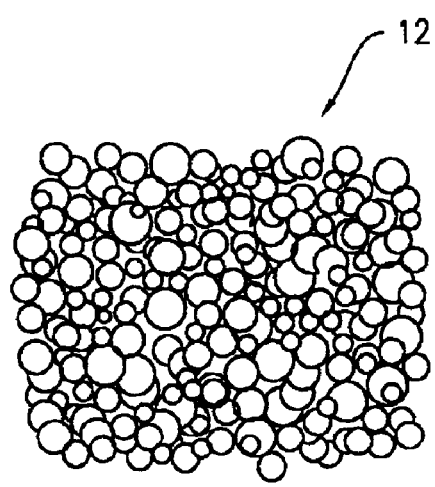
FIG. 5 is a schematic diagram of the upper surface of the metal particle part in the aforementioned sintered metal type filter.

As shown in FIG. 4, a sintered metal type filter 11 is composed of a nonwoven fabric filter part 12 and a wire gauze part 3. The nonwoven fabric filter part 12 is further composed of a coarse part 12a and a dense part 12b. The nonwoven fabric filter part 12, that is, each of the coarse part 12a and the dense part 12b, is composed of metal particles as shown in FIG. 5, and a lot of metal particles are piled up so as to make a porous three-dimensional structure having a specified thickness in the direction of the height. The wire gauze part 3 is similar to that as shown in FIG. 3A and FIG. 3B in the aforementioned embodiment.

The nonwoven fabric filter parts 2 and 12 in the aforementioned embodiments are composed of coarse parts 2a and 12a, and dense parts 2b and 12b, respectively, which have different densities, although not specifically limited to the forms as shown in FIG. 1, FIG. 2A, FIG. 2B, FIG. 4 and FIG. 5. For example, a multistage structure may be provided in which there are at least three grades between the coarse part and the dense part. The nonwoven fabric filter parts 2 and 12 may have porous structures in which the stainless steel fibers or the metal particles are folded with a uniform density.

As the wire gauze part 3 in the aforementioned embodiments, a twill basket woven stainless steel wire gauze having a mesh with slanting spacing, although the mesh cannot be seen through, is preferable since the stainless steel fibers or metal particles in the nonwoven fabric filter part are prevented from falling off. The present invention is not limited to the forms as shown in FIG. 1, FIG. 3A and FIG. 4, and, for example, plain weave, twill weave, plain basket weave, twill warp-inlay weave, etc., may be used.

Figure 6:
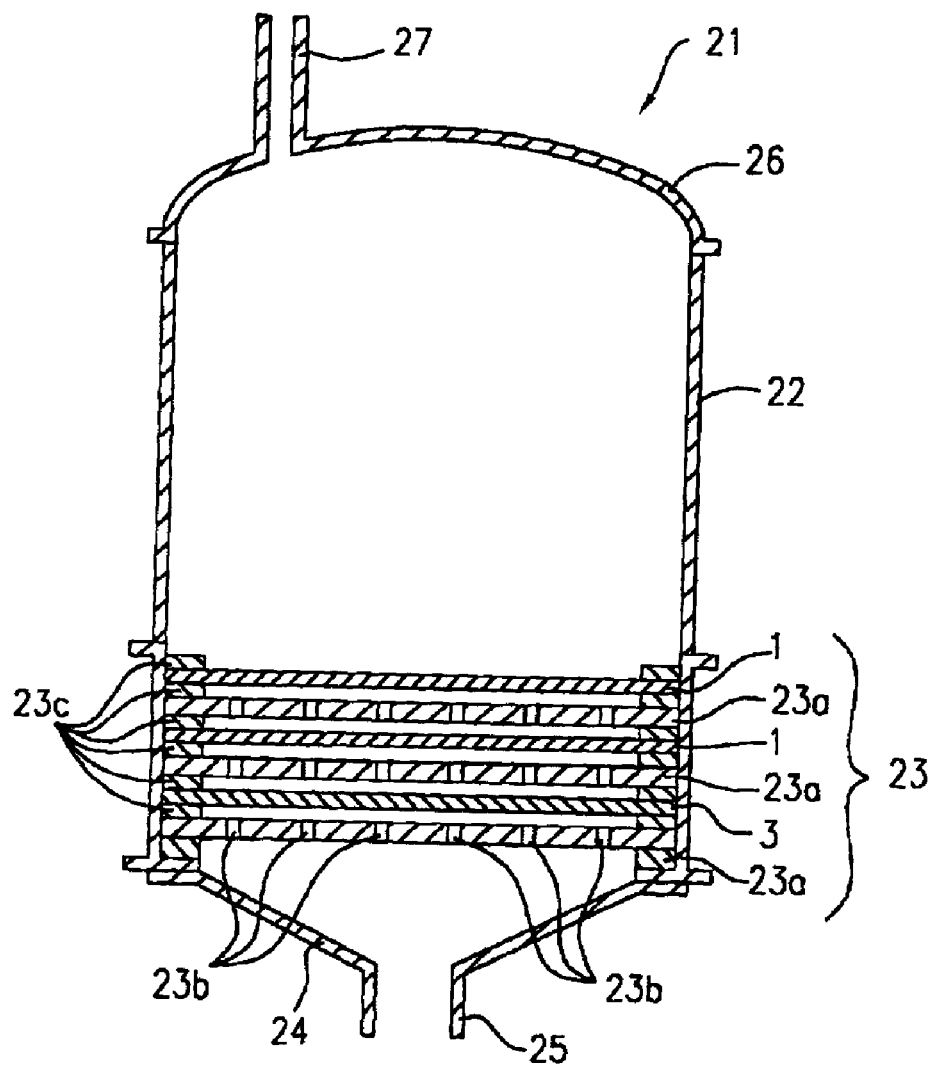
FIG. 6 is a schematic diagram of a filter apparatus according to another embodiment of the present invention.

Next, an embodiment of a filter apparatus according to the present invention will be explained with reference to FIG. 6.

A filter apparatus 21 is provided with a tank 22, a filter unit 23, a liquid collection funnel 24, a recovery path 25, a cover 26 and a pneumatic feed path 27. The tank 22 is a tank for storing the dispersion paste before the filtration, is located at the part above the filter part 23. The filter part 23 is located under the tank 22 and above the liquid collection funnel 24, and provided with sintered metal type filters 1, a stainless steel wire gauze 3, reinforcement plates 23a and packings 23c.

The alignment of the sintered metal type filters 1, the stainless steel wire gauze 3, the reinforcement plates 23a and the packings 23c in the filter part 23 is described below.

That is, the stainless steel wire gauze 3 is arranged under the two layers of the sintered metal type filters 1. As the reinforcement plates 23a, for example, plates made of stainless steel, provided with a plurality of halls 23b in the shape of a hole or a slit having enough size for the paste to pass therethrough, and have sufficient strength to support the aforementioned sintered metal type filters 1 and stainless steel wire gauze 3 from below are appropriately selected, and are arranged under each of the sintered metal type filters 1 and stainless steel wire gauze 3. The packing 23c is made of, for example, rubber, and is arranged in each of the spaces among the sintered metal type filters 1, the stainless steel wire gauze 3 and the reinforcement plates 23a in order to control the spacing.

The liquid collection funnel 24 is a funnel located under the filter part 23 in order to introduce the filtrated paste for forming the thick film into the recovery path 25.

The recovery path 25 is an outlet to remove the filtrated paste for forming the thick film, and a suction apparatus (not shown) is provided thereunder so as to suction and discharge the paste for forming the thick film from the liquid collection funnel 24.

The cover 26 is located above the tank 22 to seal the tank 22, and the pneumatic feed path 27 is a pipe to introduce a compressed air from a pneumatic feed apparatus (not shown) located above, into the tank 22.

Figure 7:
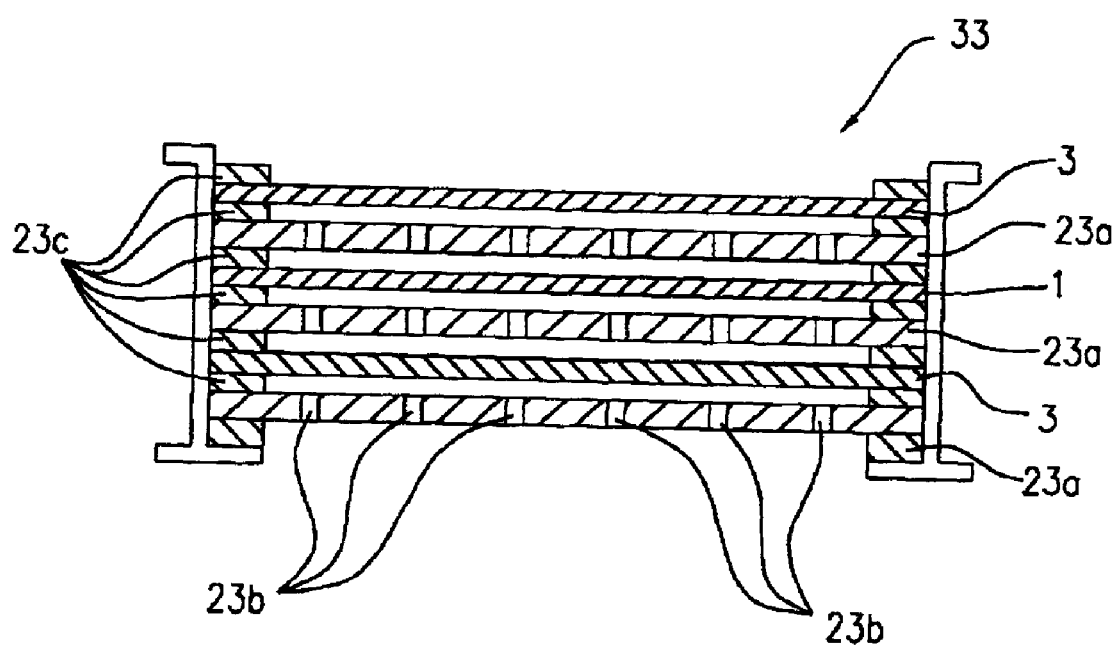
FIG. 7 is a schematic diagram of the filter part in the aforementioned filter apparatus.

Another embodiment of a filter apparatus according to the present invention will be explained with reference to FIG. 7. Herein, the same parts as those in the aforementioned embodiments are indicated by the same reference numerals as in the aforementioned embodiments and explanations thereof are omitted.

The filter part 33 is provided with a sintered metal type filter 1, stainless steel wire gauzes 3 and reinforcement plates 23a. That is, the sintered metal type filter 1 is arranged between the two layers of the stainless steel wire gauzes 3. The reinforcement plates 23a are arranged under each of the sintered metal type filters 1 and the stainless steel wire gauzes 3. The packing 23c is arranged in each of the spaces among the sintered metal type filter 1, the stainless steel wire gauzes 3 and the reinforcement plates 23a.

In the filter apparatus according to the present invention, the shapes, materials and locations of the tank 22, the liquid collection funnel 24, the recovery path 25, the cover 26 and the pneumatic feed path 27 are not limited to the aforementioned embodiments. The structure of the filter part 23 is not limited to the aforementioned embodiments, except that the sintered metal type filters 1 according to the present invention is provided. The shapes, materials and locations of the reinforcement plates 23a and the packing 23c are not limited to the aforementioned embodiments, and may not be present.

EXAMPLES

The present invention will be explained below using specific examples.

The final composition of a paste to be produced for forming a thick film was 50% by weight of Cu powder as a solid material, 10% by weight of ethyl cellulose resin as an organic binder, and 40% by weight of terpineol as a primary solvent relative to 100% by weight of the paste for forming the thick film as shown in the following Table 1.

TABLE 1

| Component | | | Content (% by weight) |
| --- | --- | --- | --- |
| Solid Material | | Cu Powder (Average Particle Diameter 0.5 μm) | 50 |
| Organic Vehicle | Organic Binder | Ethyl Cellulose Resin | 10 |
| | Primary Solvent | Terpineol | 40 |

As starting materials, 54 parts by weight of Cu powder having an average particle diameter of 0.5 μm as a solid material and 46 parts by weight of organic vehicle composed of 10 parts by weight of ethyl cellulose resin and 36 parts by weight of terpineol were prepared in a total amount of 3 kg.

These materials were mixed by agitation with a cake mixer for 1 hour, and were subjected to a dispersion treatment with a triple roller mill having a diameter of 127 mm so as to produce a dispersion paste before filtration. Regarding the conditions of the dispersion with the triple roller mill, the nip interval was 10 μm and the number of passes was 5 times.

The particle diameter of the coarse particles in the resulting disperse paste before filtration, measured with a fineness gauge, was small as 1 μm. The viscosity of the disperse paste before filtration was 10 Pa·s.

Filtration was performed under the conditions as shown in the following Table 2 so as to produce a paste for forming the thick film. That is, regarding Samples 1 to 4, multistage filter apparatuses provided with twill basket woven stainless steel wire gauzes, each having a mesh opening size of 20 μm, at the first filtration stage and the third filtration stage, and sintered metal type filters (stainless steel fiber type) having mesh opening sizes of 0.5 μm, 1.0 μm, 10.0 μm and 20.0 μm, respectively, at the second filtration stage were prepared. Regarding Sample 5, a multistage filter apparatus not provided with the first filtration stage, but provided with a sintered metal type filters (stainless steel fiber type) having a mesh opening size of 30 μm at the second filtration stage and a twill basket woven stainless steel wire gauze having a mesh opening size of 32.0 μm at the third filtration stage was prepared. Regarding Samples 6 to 8, filter apparatuses provided with a single stage of twill basket woven stainless steel wire gauze having a mesh opening size of 10.0 μm, 20.0 μm and 40.0 μm, respectively, were prepared.

Subsequently, each of the aforementioned pastes was filtrated so as to produce pastes for forming the thick film of Samples 1 to 8.

The filtration was performed by a pneumatic feed system at a pressure of 6.0 kg/cm². Each of the used sintered metal type filters and the stainless steel wire gauzes had a diameter of 50 mm. Regarding the paste for forming the thick film of Sample 9, the filtration treatment was not performed, and the aforementioned paste was used as it was.

baked ceramic laminate were coated with a conductive paste for forming a thick film containing Ag, were dried, and were baked at 800° C. to form a pair of terminal electrodes, so that 1,000 pieces of monolithic ceramic capacitors having a dimension ratio of 3.2 by 1.6 of each of Samples 1 to 9 were produced.

100 pieces of the resulting monolithic ceramic capacitors of each of Samples 1 to 9 were sampled, and the number of the pieces in which a short circuit defect occurred was

TABLE 2

| | Filtration | | | | | |
|---|---|---|---|---|---|---|
| | First Stage | | Second Stage | | Third Stage | |
| Sample | Material | Mesh Opening Size ($\mu$m) | Material | Mesh Opening Size ($\mu$m) | Material | Mesh Opening Size ($\mu$m) |
| 1 | Twill Basket Woven Stainless Steel Wire Gauze | 20.0 | Sintered Metal Type Filter | 0.5 | Twill Basket Woven Stainless Steel Wire Gauze | 20.0 |
| 2 | | | | 1.0 | | |
| 3 | | | | 10.0 | | |
| 4 | | | | 20.0 | | |
| 5 | — | | | 30.0 | | 32.0 |
| 6 | Twill Basket Woven Stainless Steel Wire Gauze | 10.0 | — | | — | |
| 7 | | 20.0 | | | | |
| 8 | | 40.0 | | | | |
| 9 | — | | | | | |

Liquid Feed System: Pneumatic Feed
Pressure: 6.0 kg/cm²
Filter Diameter: 50 $\mu$m In the filtration of the disperse paste with each of the filter apparatuses, the total amount of the filtrated paste until the filtration velocity was decreased to a half of that at the start of the filtration, that is, the filtration amount, was measured for each of Samples 1 to 8. The results thereof are summarized in Table 3.

Furthermore, the number of lump materials, having a size of 30 $\mu$m or more, present in 100 g of the paste for forming the thick film of each of Samples 1 to 9 was counted. The results thereof are summarized in Table 3.

Then, ceramic green sheets of 5 $\mu$m in thickness containing a reduction-resistant ceramic with B-level characteristic in accordance printed with the pastes of Samples 1 to 9 for forming the thick film, which become coating films having a thicknesses of 1.5 $\mu$m after baking, so that electrode films of Samples 1 to 9, which become internal electrodes after baking, were formed.

The electrode films of Samples 1 to 9 applied on the ceramic green sheets by printing were observed, and the number of lump materials in one electrode film was counted. The results thereof are summarized in Table 3.

Subsequently, 70 layers of ceramic green sheets of each of Samples 1 to 9 printed with the electrode film were stacked, and thereafter, were pressure-bonded, and were cut into predetermined sizes so as to produce green ceramic laminates of Samples 1 to 9.

The resulting green ceramic laminates of Samples 1 to 9 were subjected to a binder removal treatment in an atmosphere of nitrogen, and thereafter, were baked in a weakly reducing atmosphere at 1,300° C. Both end faces of the examined and the defect occurrence rate was determined. The results are summarized in Table 3.

TABLE 3

| Sample | Filtration Amount (kg) | Number of Lump Material in Paste for Forming Thick Film (piece) | Number of Lump Material in One electrode Film (piece) | Short Circuit Defect Rate (%) |
|---|---|---|---|---|
| 1 | 0.1 | 0 | 0 | 0 |
| 2 | 1.0 | 0 | 0 | 0 |
| 3 | 7.0 | 0 | 0 | 1 |
| 4 | 9.0 | 0 | 0 | 2 |
| 5 | 12.6 | 2 | 6 | 10 |
| 6 | 0.8 | 2 | 3 | 7 |
| 7 | 6.4 | 4 | 7 | 15 |
| 8 | 15.2 | 13 | 15 | 27 |
| 9 | — | Many | Many | 100 |

Table 3 shows that using the pastes for forming the thick film of Samples 1 to 4 filtrated using sintered metal type filters having mesh opening sizes of 0.5 $\mu$m to 20.0 $\mu$m, the number of lump materials having a size of 30 $\mu$m or more present in 100 g of the paste was 0 in every Sample, and the number of lump materials in one electrode film was 0 in every Sample. The short circuit defect rate of the monolithic ceramic capacitor was 0% regarding each of Samples 1 and 2 using sintered metal type filters having mesh opening sizes of 0.5 $\mu$m and 1.0 $\mu$m, respectively. The short circuit defect rate of Samples 3 and 4 using sintered metal type filters having mesh opening sizes of 10.0 $\mu$m and 20.0 $\mu$m were 1% and 2%, respectively, so that a minuscule number of short circuit defects occurred and this is within an acceptable range in practice.

On the other hand, regarding the paste of Sample 5 for forming the thick film using a sintered metal type filter having mesh opening size of 30.0 μm, two lump materials having a size of 30 μm or more were observed in 100 g of the paste, and six lump materials were observed in one electrode film. Since the aforementioned lump materials were present in the paste for forming the thick film and the electrode film, the defect rate of the monolithic ceramic capacitors was high as 10%.

Regarding Samples 6 to 8 using only conventional stainless steel wire gauzes instead of using the sintered metal type filter and Sample 9 not subjected to filtration, 2 to many lump materials were observed in the paste for forming the thick film, and 3 to many lump materials were observed in one electrode film. Since the aforementioned lump materials were present in the paste for forming the thick film and the electrode film, the defect rates of the monolithic ceramic capacitors were high as 7% to 100%.

Since the lump materials in the disperse paste adhere to the sintered metal type filter and the stainless steel wire gauze during the filtration, the filtration velocity of the disperse paste decreases. That is, the filtration amount is an indicator of the lifetime of the filter, i.e., the operation efficiency. When comparisons are made between the pastes for forming the thick film of Samples 3 and 7, the filtration amounts were 7.0 kg and 6.4 kg, respectively, which were nearly equivalent, although the number of lump materials in the paste for forming the thick film, the number of lump materials in one electrode film and the short circuit defect rate of the monolithic ceramic capacitor of Sample 3 were 0, 0 and 1%, respectively, while the number of lump materials in the paste for forming the thick film, the number of lump materials in one electrode film and the short circuit defect rate of the monolithic ceramic capacitor of Sample 7 were 4 pieces, 7 pieces and 15%, respectively.

As is clear from Table 3, accompanying an increase in the filtration amount, the number of lump materials in the paste for forming the thick film, the number of lump materials in one electrode film and the short circuit defect rate of the monolithic ceramic capacitor of every Sample increase on a proportional basis, although according to the method for manufacturing the paste for forming the thick film of the present invention, the defect ratio can be decreased without a decrease in the operation efficiency of the filtration.

According to the method for manufacturing the paste for forming the thick film of the present invention, since the step of filtering the paste which contains the solid material and the organic vehicle and has a viscosity in the range of about 1 to 50 Pa·s with the filter including the nonwoven fabric filter part having the mesh opening size of about 1 to 20 μm is provided, the undesired lump materials can be efficiently removed from the paste for forming the thick film.

When the filter is composed of the sintered metal type filter manufactured by integrally sintering the nonwoven fabric filter part, having the specified thickness of a lot of folded linear metal fibers, and the wire gauze part composed of the metal wires knitted into the shape of the mesh, metal fibers falling off from the nonwoven fabric filter part hardly get into the paste for forming the thick film. Therefore, the occurrence of the short circuit defect can be decreased in a monolithic ceramic capacitor in which the internal electrode is formed from the resulting paste for forming the thick film.

When the nonwoven fabric filter part having the specified thickness composed of many folded linear metal fibers has the multilayer structure in which the neighborhood of the surface of the nonwoven fabric filter part is coarsest and the neighborhood of the interface between the nonwoven fabric filter part and the wire gauze part is densest, large lump materials are removed at the neighborhood of the upper surface of the nonwoven fabric filter, and subsequently finer lump materials are removed at the neighborhood of the center part of the nonwoven fabric filter. As a consequence, clogging of the nonwoven fabric filter can be reduced and the operation efficiency of the filtration treatment can be increased without a decrease in the lifetime of the whole of the filter.

Furthermore, when the filter is composed of the sintered metal type filter manufactured by integrally sintering the nonwoven fabric filter part, composed of the porous aggregate of the metal particles, and the wire gauze part composed of the metal wires knitted into the shape of the mesh, metal fibers falling off from the nonwoven fabric filter part hardly get into the paste for forming the thick film. Therefore, the occurrence of the short circuit defect can be decreased in the monolithic ceramic capacitor in which the internal electrode is formed from the resulting paste for forming the thick film.

When the aforementioned nonwoven fabric filter part composed of the porous aggregate of the metal particles has the multilayer structure, in which the neighborhood of the surface of the nonwoven fabric filter part is coarsest and the neighborhood of the interface between the nonwoven fabric filter part and the wire gauze part is densest, large lump materials are removed at the neighborhood of the upper surface of the nonwoven fabric filter, and subsequently finer lump materials are removed at the neighborhood of the center part of the nonwoven fabric filter, so that the clogging of the nonwoven fabric filter can be reduced, and the operation efficiency of the filtration treatment can be increased without a decrease in the lifetime of the filter.

In addition, when a plurality of aforementioned sintered metal type filters are arranged in vertically multiple stages, the lifetime of the lower stage filter can be increased.

When the wire gauze type filter, including the metal wires knitted into the shape of the mesh, is provided in at least one of the upper stage and the lower stage of the aforementioned sintered metal type filter, the lifetime of the lower stage filter can be increased.

What is claimed is:

1. A method for manufacturing a paste for forming a thick film, comprising filtering a paste through a filter comprising a first nonwoven fabric filter having a mesh opening size of about 1 to 20 μm, wherein said first nonwoven filter comprises a multitude of sintered folded linear metal fibers, wherein said paste comprises a solid material and an organic vehicle, and said paste has a viscosity in the range of about 1 to 50 Pa·s, and wherein after passing through said first nonwoven filter said paste is filtered through a wire gauze comprising knitted metal wires in the shape of a mesh, whereby undesired lump material are removed from said paste.

2. A method for manufacturing a paste for forming a thick film according to claim 1, wherein said first nonwoven filter comprises stainless steel fiber.

3. A method for manufacturing a paste for forming a thick film according to claim 1, wherein said wire gauze comprises stainless steel wire gauze.

4. A method for manufacturing a paste for forming a thick film according to claim 3, wherein said first nonwoven filter has a surface which interfaces said wire gauze and a second surface distant therefrom, and wherein said first nonwoven filter has a porosity which is greatest in the neighborhood of said second surface and is least in the neighborhood of said interface surface.

5. A method for manufacturing a paste for forming a thick film according to claim 4, wherein said first nonwoven filter comprises stainless steel fiber.

6. A method for manufacturing a paste for form a thick film according to claim 4, wherein said first nonwoven filter comprises a porous aggregate of metal particles.

7. A method for manufacturing a paste for forming a thick film according to claim 4, wherein there is at least one second nonwoven filter comprising sintered metal arranged vertically above said first nonwoven filter, and wherein said paste is filtered by said second nonwoven filter prior to being filtered by said first nonwoven filter.

8. A method for manufacturing a paste for forming a thick film according to claim 7, wherein said wire gauze is disposed at the vertically below said first nonwoven filter and there is a second wire gauze comprising knitted metal wires in the shape of a mesh disposed vertically above said second nonwoven filter, and wherein said paste is filtered through said second wire gauze prior to being filtered by said second nonwoven filter.

9. A method for manufacturing a paste for forming a thick film, comprising filtering a paste through a filter comprising a first nonwoven fabric filter having a mesh opening size of about 1 to 20 μm, wherein said first nonwoven filter comprises a sintered porous aggregate of metal particles, wherein said paste comprises a solid material and an organic vehicle, and said paste has a viscosity in the range of about 1 to 50 Pa·s, and wherein after passing through said first nonwoven filter said paste is filtered through a wire gauze comprising knitted metal wires in the shape of a mesh, whereby undesired lump material are removed from said paste.

10. A method for manufacturing a paste for forming a thick film, comprising filtering a paste through a filter comprising a first nonwoven fabric filter comprising sintered metal and having a mesh opening size of about 1 to 20 μm, wherein said paste comprises a solid material and an organic vehicle, and wherein said paste has a viscosity in the range of about 1 to 50 Pa·s, and wherein after passing through said first nonwoven filter said paste is filtered through a wire gauze comprising knitted metal wires in the shape of a mesh, whereby undesired lump material are removed from said paste, wherein there is at least one second nonwoven filter comprising sintered metal arranged vertically above said first nonwoven filter, and wherein said paste is filtered by said second nonwoven filter prior to being filtered by said first nonwoven filter.

11. A method for manufacturing a paste for forming a thick film according to claim 10, wherein said wire gauze is disposed at the vertically below said first nonwoven filter and there is a second wire gauze comprising knitted metal wires in the shape of a mesh disposed vertically above said second nonwoven filter, and wherein said paste is filtered through said second wire gauze prior to being filtered by said second nonwoven filter.

12. A filter apparatus comprising a filter for filtering a paste which comprises a solid material and an organic vehicle and has a viscosity in the range of about 1 to 50 Pa·s, said filter comprising a first sintered nonwoven fabric filter having a mesh opening size of about 1 to 20 μm, wherein said filter comprises said first nonwoven filter which comprises sintered metal in combination with a wire gauze comprising knitted metal wires in the shape of a mesh, wherein said first nonwoven filter comprises a sintered multitude of folded linear metal fibers.

13. A filter apparatus according to claim 12 wherein said first nonwoven filter comprises stainless steel fiber.

14. A filter apparatus according to claim 12, wherein said wire gauze comprises stainless steel wire gauze.

15. A filter apparatus according to claim 12, wherein said first nonwoven filter has a surface which interfaces said wire gauze and a second surface distant therefrom, and wherein said first nonwoven filter has a porosity which is greatest in the neighborhood of said second surface and which is least in the neighborhood of said interface surface.

16. A filter apparatus comprising a filter for filtering a paste which comprises a solid material and an organic vehicle and has a viscosity in the range of about 1 to 50 Pa·s, said filter comprising a first sintered nonwoven fabric filter having a mesh opening size of about 1 to 20 μm, wherein said filter comprises said first nonwoven filter which comprises sintered metal in combination with a wire gauze comprising knitted metal wires in the shape of a mesh, wherein said first nonwoven filter comprises a sintered porous aggregate of metal particles.

17. A filter apparatus according to claim 16 wherein said first nonwoven filter comprises stainless steel fiber.

18. A filter apparatus according to claim 16, wherein said wire gauze comprises stainless steel wire gauze.

19. A filter apparatus according to claim 16, wherein said first nonwoven filter has a surface which interfaces said wire gauze a second surface distant therefrom, and wherein said first nonwoven filter has a porosity which is greatest in the neighborhood of said second surface and which is least in the neighborhood of said interface surface.

20. A filter apparatus comprising a filter for filtering a paste which comprises a solid material and an organic vehicle and has a viscosity in the range of about 1 to 50 Pa·s, said filter comprising a first sintered nonwoven fabric filter having a mesh opening size of about 1 to 20 μm, wherein said filter comprises said first nonwoven filter which comprises sintered metal in combination with a wire gauze comprising knitted metal wires in the shape of a mesh, and at least one second nonwoven filter comprising sintered metal disposed vertically above said first nonwoven filter.

21. A filter apparatus according to claim 20, having a second wire gauze comprising knitted metal wires in the shape of a mesh disposed vertically above said second nonwoven filter.

22. A filter apparatus according to claim 20 wherein said first nonwoven filter comprises stainless steel fiber.

23. A filter a apparatus according to claim 20, wherein said wire gauze comprises stainless steel wire gauze.

24. A filter apparatus according to claim 20, wherein said first nonwoven filter has a surface which interfaces said wire gauze and a second surface distant therefrom, and wherein said first nonwoven filter has a porosity which is greatest in the neighborhood of said second surface and which is least in the neighborhood of said interface surface.

* * * * *